United States Patent
Anderson et al.

(10) Patent No.: US 11,720,811 B2
(45) Date of Patent: Aug. 8, 2023

(54) COGNITIVE MATCHING OF CONTENT TO APPROPRIATE PLATFORM

(71) Applicant: KYNDRYL, INC., New York, NY (US)

(72) Inventors: Evelyn R. Anderson, Houston, TX (US); Kristen Conley, Kieler, WI (US); Martin G. Keen, Cary, NC (US); Natalie Brooks Powell, Bolingbrook, IL (US)

(73) Assignee: Kyndryl, Inc., New York, NY (US)

( * ) Notice: Subject to any disclaimer, the term of this patent is extended or adjusted under 35 U.S.C. 154(b) by 851 days.

(21) Appl. No.: 16/048,986

(22) Filed: Jul. 30, 2018

(65) Prior Publication Data

US 2020/0034731 A1 Jan. 30, 2020

(51) Int. Cl.
*H04L 29/08* (2006.01)
*G06N 5/04* (2023.01)
*G06N 5/046* (2023.01)
*H04L 67/10* (2022.01)

(52) U.S. Cl.
CPC .......... *G06N 5/046* (2013.01); *H04L 67/10* (2013.01)

(58) Field of Classification Search
CPC ........ G06Q 10/10; G06Q 50/01; G06Q 30/02; G06N 5/046; H04L 67/10; H04L 51/10; H04L 67/22; H04L 67/306; H04L 51/18; H04L 51/32
See application file for complete search history.

(56) References Cited

U.S. PATENT DOCUMENTS

| | | | |
|---|---|---|---|
| 7,366,759 B2 | 4/2008 | Trevithick et al. | |
| 7,886,000 B1 | 2/2011 | Polis et al. | |
| 9,628,575 B1* | 4/2017 | Lewis | G06F 3/0483 |
| 2010/0092093 A1* | 4/2010 | Akatsuka | G06T 7/30 382/218 |
| 2011/0125924 A1 | 5/2011 | McAleer | |
| 2013/0066964 A1 | 3/2013 | Odio et al. | |
| 2014/0114774 A1* | 4/2014 | Schultz | G06Q 30/02 709/204 |
| 2014/0278968 A1* | 9/2014 | Strompolos | G06Q 30/0249 705/14.52 |
| 2015/0169747 A1* | 6/2015 | Hume | G06F 16/686 704/8 |
| 2015/0256569 A1* | 9/2015 | Sathish | G06F 16/288 709/204 |
| 2016/0380951 A1* | 12/2016 | Chakra | H04L 51/32 709/206 |
| 2017/0060396 A1* | 3/2017 | Lewis | G06F 3/0482 |
| 2017/0142176 A1* | 5/2017 | Bostick | H04L 51/32 |
| 2017/0359292 A1* | 12/2017 | Aziz | H04L 51/16 |
| 2018/0020044 A9 | 1/2018 | Bank et al. | |
| 2018/0034896 A1* | 2/2018 | Seacat DeLuca | H04L 51/32 |
| 2018/0129929 A1* | 5/2018 | Shigenaka | G06Q 50/10 |
| 2019/0005552 A1* | 1/2019 | Moniz | G06N 20/00 |

* cited by examiner

*Primary Examiner* — Abdullahi E Salad
(74) *Attorney, Agent, or Firm* — Ei K Swanson; George S. Blasiak; Heslin Rothenberg Farley & Mesiti P.C.

(57) ABSTRACT

Methods and systems may provide for technology to recognize features of current content to be shared by a current user, determine a plurality of platforms that allow access to data by other users and select one or more of the plurality of platforms to store the current content based on the recognized features.

19 Claims, 4 Drawing Sheets

COGNITIVE MATCHING OF CONTENT TO APPROPRIATE PLATFORM

BACKGROUND

Embodiments generally relate to content management. More particularly, embodiments identify content and manage actions to be taken with the content.

Some enterprises may have several platforms that a user may access. Each platform has a slightly differing purpose, and as a result has different connections on each network. For example, a user may primarily use a first platform for sharing content with a first group of co-workers (e.g., all workers), and a second platform for sharing content with a second group of co-workers (e.g., only managers). Further, in some cases only a specific platform (e.g., a server) may be appropriate for a specific type of content (e.g., a distributable source code or application), whereas another secured platform may be used to store sensitive documents.

Some tools are used to load content to multiple platforms. Such tools may not provide insightful guidance for which platform is most relevant and/or appropriate for content. Therefore, content may be provided to inappropriate platforms, thereby reducing security, increasing latency of the operation and excessively consuming power. Accordingly, conventionally managed content may be costly to upload, sub-optimally uploaded from a performance standpoint and/or insecurely managed.

BRIEF SUMMARY

Embodiments may include a computing device comprising one or more processors, and a computer readable storage medium having program instructions embodied therewith, the program instructions executable by the one or more processors to cause the computing device to recognize features of current content to be shared by a current user, determine a plurality of platforms that allow access to data by other users; and select one or more of the plurality of platforms to store the current content based on the recognized features.

Embodiments may also include a computer program product to distribute current content, the computer program product comprising a computer readable storage medium having program instructions embodied therewith, the program instructions executable by a computing device to cause the computing device to recognize features of current content to be shared by a current user, determine a plurality of platforms that allow access to data by other users, and select one or more of the plurality of platforms to store the current content based on the recognized features.

Embodiments may also include a method comprising recognizing features of current content to be shared by a current user, determining a plurality of platforms that allow access to data by other users, and selecting one or more of the plurality of platforms to store the current content based on the recognized features

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
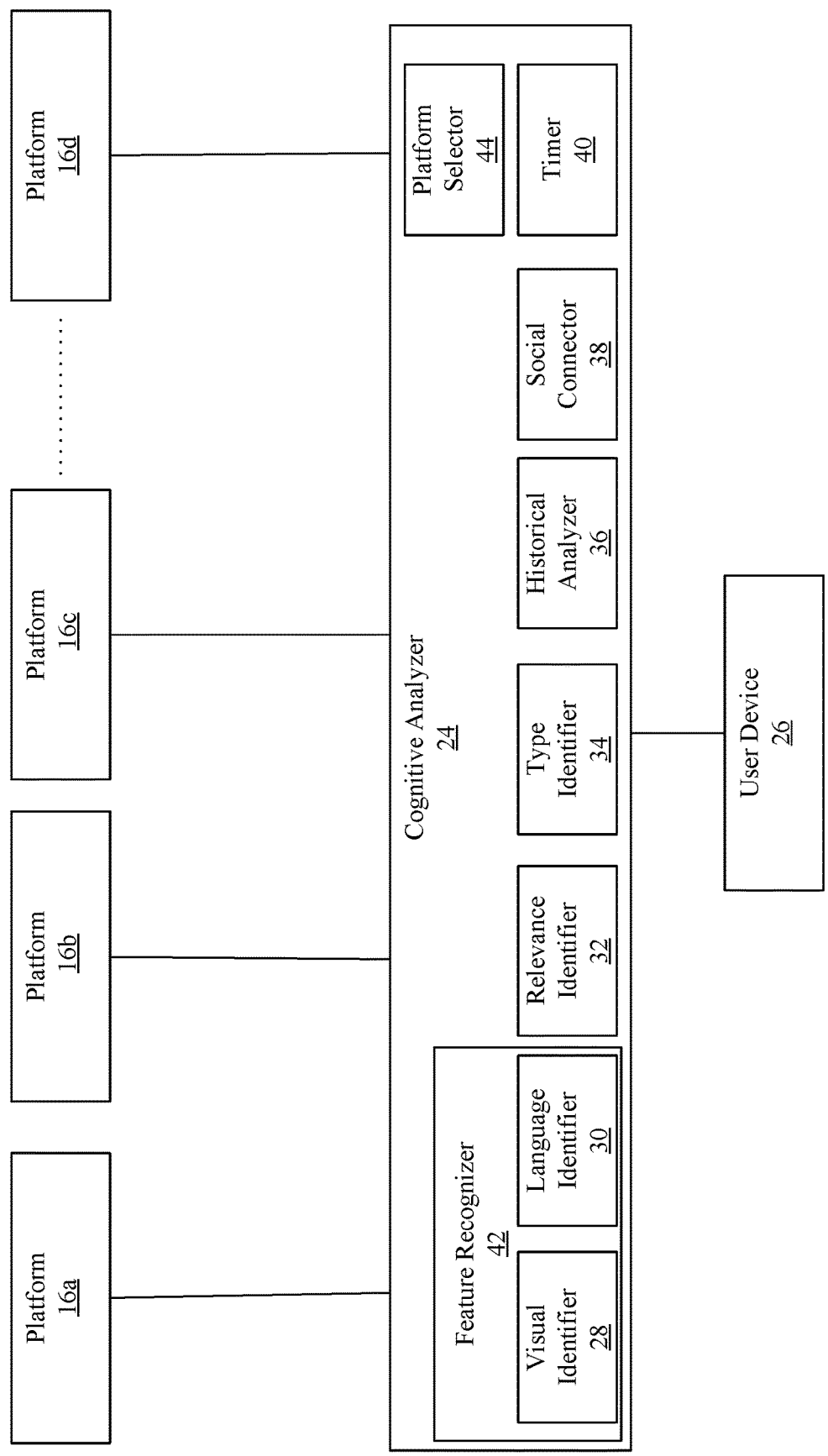
FIG. 1 is a block diagram of an example of an efficiency-enhanced computing architecture according to an embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, an efficiency-enhanced computing architecture 10 is shown in which a user device 26 communicates with platforms 16a-16d and a cognitive analyzer 24. The cognitive analyzer 24, which includes logic instructions, computer readable program instructions, configurable logic, fixed-functionality hardware logic, etc., or any combination thereof, serves as an intermediate layer between the user device 26 and platforms 16a-16d. The cognitive analyzer 24 is connected to the user device 26 through the Internet or a direct connection such as a cable. The cognitive analyzer 24 may be a computing device such as a server or desktop.

The platforms 16a-16d may be social network platforms or enterprise platforms, which include logic instructions, computer readable program instructions, configurable logic, fixed-functionality hardware logic, etc., or any combination thereof. The platforms 16a-16d may be servers or any type of computing device. The platforms 16a-16d are accessed by different groups of people and serve different purposes. For example, platform 16a may be accessed by a first group of users, and platform 16b may be accessed by a second group of users. The first group of users may be different from the second groups of users and include different users. In some embodiments, the groups of users include at least some users that are the same between the groups of users. In some embodiments, the groups of users may have different access permissions and different positions within an enterprise.

In some embodiments, the platforms 16a-16d are utilized for different purposes. For example, the platform 16a may be utilized to store sensitive information, while the platform 16b may be utilized to store information that is not sensitive. As another example, the platform 16a may be utilized to store work related content to be accessed by colleagues, while the platform 16b may be utilized to store user content to be accessed by friends.

A user prepares and provides content on the user device 26. Some examples of content include images, video, text, documents, captions, links, computer code, and so forth. The content may be intended for sharing with third parties. The user device 26 may be under the direct control of the user, who is also be referred to as a current user. The content is also referred to current content.

The user may determine that the current content is to be shared with other users, and therefore should be uploaded to one or more of the platforms 16a-16d. The user does not need to identify the specific platforms 16a-16d that are to receive the current content. Rather, the user authorizes the cognitive analyzer 24 to determine an appropriate platform of the platforms 16a-16d to receive and distribute the current content. The current content is then uploaded to the appropriate platform by the cognitive analyzer 24. Thus, the current content is provided from the user device 26 to the cognitive analyzer 24 without an identification of a specific platform. In turn, the cognitive analyzer 24 identifies the specific platform to receive and distribute the current content.

The illustrated cognitive analyzer 24 cognitively analyzes the current content before the current content is posted on a platform (e.g., a social network or enterprise platform). The cognitive analyzer 24, as described in further detail below, may analyze and classify the current content, identify characteristics of the platforms 16a-16d and select a platform of the platforms 16a-16d to receive the current content based on the analysis, classification and characteristics.

For example, the cognitive analyzer 24 cognitively matches the analyzed and classified current content to social and business network connections of a user and identifies relevance of the current content to the network connections. The social and business network connections may be other users of the platforms 16a-16d that may access and/or receive information from the platforms 16a-16d. The cognitive matching includes determining one or more of the platforms 16a-16d to post the current content. Furthermore, the cognitive matching includes when to post the current content to one or more of the platforms 16a-16d based on the cognitive match.

The cognitive analyzer 24 includes a feature recognizer 42. The feature recognizer 42 may identify features and tags of the current content, and stores the features and tags in a repository such as a database or table. For example, the feature recognizer 42 includes a visual identifier 28 and language identifier 30 to identify the features.

The visual identifier 28 may identify visual features. For example, the visual identifier 28 recognizes key visual features in a picture of the current content. The visual identifier 28 identifies elements of the picture (e.g., structures, beach, water spots, boogie boarding, smiles, wet suits, food, beverages, etc.). In some embodiments, the visual identifier 28 determines a location from the identified elements. For example, if a structure of visual content is distinctive (e.g., the Eiffel Tower), the location may be automatically tagged to the visual content. Moreover, the visual identifier 28 may further associate a tag indicating whether a picture is one or more of a professional, or social picture and based on features such as smiles, location, attire (e.g., suits implies a professional context), and so forth.

The visual identifier 28 may further apply facial recognition techniques to visual content. For example, faces in the visual content may be identified, and compared to faces appearing in images and videos. For example, one or more of the platforms 16a-16d may include tagged faces that are tagged to names of individuals. That is, each tagged face is associated with a name. The visual identifier 28 may extract a recognized face from the visual content, and compare the recognized face to the tagged faces. If the recognized face resembles one of the tagged faces, the visual identifier 28 may associate the name of the one tagged face, with the recognized face from the visual content.

The language identifier 30 analyzes unstructured text in the current content, such as a status updates for a social network, captions, links, key words in a document, computer program text and so forth to derive meaning and/or importance. For example, a textual status update may be related to game. In another example, a document may contain words associated with sensitive information (e.g., "top secret" or a name associated with sensitive project), in which case the language identifier 30 may tag the document as being important and/or secretive. In some embodiments, a location and/or name may be identified from the current content and tagged to the current content. For example, the language identifier 30 may identify that the current content includes text indicating a game match, and that the match involved two specific teams at a particular location.

In some embodiments, the cognitive analyzer 24 includes a platform selector 44 to cognitively match the current content based on the features and tags of the current content to one or more of the platforms 16a-16d, and provide the current content to the matched one or more platforms 16a-16d. The cognitive analyzer 24 may analyze network accounts hosted by the platforms 16a-16d that are connected to and/or utilized by the user to identify the matched one or more platforms. The cognitive analyzer 24 may include a relevance identifier 32, type identifier 34, historical analyzer 36, social connector 38 and timer 40 that each may utilize and receive outputs from the feature recognizer 42.

In some embodiments, the historical analyzer 36 determines, based on the recognized features of the current content recognized by the feature recognizer 42, previously shared content by the user that is similar to the current content. The historical analyzer 36 may further identify that the previously shared content was uploaded and/or provided to one or more of the plurality of platforms 16a-16d. Therefore, in some embodiments the platform selector 44 provides preference to uploading the current content to the one or more of the plurality of platforms 16a-16d.

As such, the platform selector 44 may determine that the current content is to be uploaded to a particular one of the platforms 16a-16d based on whether previous similar content was uploaded to the particular one of the platforms 16a-16d. In some embodiments, the historical analyzer 36 may identify that a particular type of content (e.g., sensitive documents) should only be uploaded to a particular one of the platforms 16a-16d (e.g., a secure platform) based on previous documents of the same type (e.g., sensitive documents) being uploaded to the particular one of the platforms 16a-16d.

In some embodiments, the historical analyzer 36 identifies engagement of similar content (e.g., posts to social media) based on a level of engagement. The level of engagement may measure the interest in content on a particular platform of one of the platforms 16a-16d. For example, the historical analyzer 36 may identify previously shared posts that were previously shared by the user and that are related to a current post of the current content. In some embodiments, related posts and current posts are all identified as being related if the related and current posts are a same type (e.g., game related or security related). The level of interest of the related posts may be measured and utilized as a metric to identify suitable ones of the platforms 16a-16d.

For example, if related posts are identified, the historical analyzer 36 may analyze the engagement for those related posts. If the user previously shared a social picture taken on the beach to FACEBOOK and TWITTER, the historical analyzer 36 may analyze a level engagement these posts received through a metric (e.g., likes, comments, shares) on the corresponding social network and identify whether the level of engagement is above a threshold. For each one of the platforms 16a-16d that is identified as having a level of engagement for previously shared content above the threshold, the historical analyzer 36 may determine that similar content (e.g., pictures) should be provided to the corresponding one of the platforms 16a-16d, and provide the determination to the platform selector 44. In an enterprise setting, if a user previously uploaded a document or source code of a program for example, a similar analysis may apply with the level of engagement being measured by another metric, such as downloads, views, executions etc.

In some embodiments, the platform selector 44 receives the information from the historical analyzer 36 to identify one or more platforms to receive the current content. For example, if the historical analyzer 36 identifies that the historical level of engagement for pictures is above a threshold for platform 16c but not platform 16d, the platform selector 44 may then determine that a picture of the current content may be uploaded to platform 16c.

In some embodiments, the social connector 38 determines one or more other connected users that are connected with the current user through the platforms 16a-16d. The one or more other users may be direct contacts of the current user through the platforms 16a-16d. The social connector 38 may determine other user content, previously shared by the one or more other connected users through the platforms 16a-16d that is similar to the current content. The social connector 38 may determine that the other user content was provided to one or more of the plurality of platforms 16a-16d, and the platform selector 44 may therefore determine that the one or more of the plurality of platforms 16a-16d should receive the current content.

In some embodiments, the social connector 38 determines interest profiles for each of the platforms 16a-16d. The interest profiles may be associated with other users of each of the platforms 16a-16d, and identify interests of the other users. For example, the social connector 38 may identify connected users of platform 16a that are connected to the current user. Each of the connected users may have an interest profile. The social connector 38 may compare the recognized features of the current content to the interest profiles of the connected users to determine whether the current content may be of interest to the connected users of platform 16a. Likewise, interest profiles may be built for users of each of the other platforms 16b-16d, to identify whether social connections may be interested in the current content. It will be understood that social connections may include friendship connections, professional connections, relatives and so forth.

In an example, the social connector 38 may identify interest profiles of social network connections. By analyzing the current content of other social network users that a person is connected to via the platforms 16a-16d (e.g., friends on a social networking site), the social connector 38 may generate interest profiles of social connections on each platform 16a-16d. For example, the cognitive analyzer 24 may determine that a connection on a social media site frequently shares links about games. Thus, the interest profile of the connection indicates that the connection is interested in games. If the current content contains game related information, the interest profile may be utilized by the platform selector 44 to determine that a platform of the platforms 16a-16d that the connection utilizes should receive the current content.

In some embodiments, the social connector 38 further applies weights to different connections. For example, a first degree connection (someone who is a direct connection or confirmed as a colleague or friend of the user) may have an increased weight as opposed to a second or third degree connection (e.g., someone who is indirectly connected to the user through colleagues or friends). Therefore, the interest profiles may be weighted depending on a strength of connection between the user and the users of the platforms 16a-16d.

The platform selector 44 may utilize the interest profiles to select one or more of the platforms 16a-16d. If the platform selector 44 identifies that the interest profiles associated with one of the platforms 16a-16d correspond to a sufficient interest in the current content (e.g., a significant correlation is identified between the weighted interest profiles and features of the current content), then the current content may be uploaded to the one of the platforms 16a-16d.

In some embodiments, the type identifier 34 executes a classification to determine for each respective platform of the plurality of platforms 16a-16d, types of content that are published by the respective platform 16a-16d. The type identifier 34 further identifies a current type of the current content based on the recognized features recognized by the feature recognizer 42. The type identifier 34 determines for each respective platform 16a-16d, whether the current type is substantially similar to one or more of the types of content of the respective platform 16-16d. The platform selector 44 may provide the current content to a platform of the platforms 16a-16d if the platform of the platforms 16a-16d includes content (e.g., sensitive documents) that is of a same type as the current content (e.g., sensitive documents).

Therefore, the type identifier 34 may identify the appropriateness of each platform 16a-16d. For example, while network connections may share common interests with new content, the new content should be appropriate to the platform of the platforms 16a-16d utilized by the network connections. Therefore, the type identifier 34 may not classify a picture on the beach as appropriate for a professional site or platform, but should be provided to social media friendship site such as Facebook™. In contrast, sensitive source code or a picture identified by the feature recognizer 42 as being professional may not be appropriate for a social media friendship site, but may be appropriate for an internal enterprise site or social media professional site such as LinkedIn™. In some embodiments, the platform selector 44 checks the platforms 16a-16d against the classifications by the type identifier 34, and excludes any of the platforms 16a-16d from receiving the current content if the type of the current content is incongruous with the types supported by the excluded platforms of the platform 16a-16d.

The relevance identifier 32 may determine that features extracted by the feature recognizer 42 are relevant to other users. The relevance identifier 32 may further determine that the other users are associated with one or more of the plurality of platforms 16a-16d. The platform selector 44 therefore may determine that the current content should be provided to the one or more of the plurality of platforms 16a-16d.

Therefore, in some embodiments the relevance identifier 32 determines relationships among users of the platforms 16a-16d, and whether the current content may be relevant to those users. For example, the relevance identifier 32 may compare a person identified in content, such as a person appearing in a photo or identified by a name in a document, and analyze how relevant that person is to a given one of the platforms 16a-16d. For example, the person may not be connected to the current user through platform 16a and/or utilize the platform 16a, and therefore the current content should not be uploaded to platform 16a. The person may be connected to the current user through platform 16b and/or utilize the platform 16b and therefore the current content may be provided to platform 16b.

In some embodiments, the relevance identifier 32 considers the relevance of the current content to users, who are not specifically referenced in the current content but that potentially have interest in the current content. For example, the relevance identifier 32 may not only identify a person who is directly referenced in the current content, but associated people who are related and/or associated with the referenced person. The relevance identifier 32 may identify that the associated people utilize a specific one of the platforms 16a-16d, and therefore that the platform selector 44 may determine that the current content should be uploaded to that specific one of the platforms 16a-16d. The associated people may or may not be connected to the current user.

In some embodiments, the timer 40 determines a timing to communicate the current content based on a timing of usage of the one or more platforms 16a-16d by other users. For example, if most users that have interest in a specific content are located in England, then the timing should correspond to hours that people in England are awake, and utilizing the platform. In some embodiments, the timer 40 only considers the timings of users who may be interested in the current content, as determined by the relevance identifier 32 and social connector 38 for example. In some embodiments, the timer 40 considers only users that are connected to the current user, and identifies the timing of the user's activity through timings of actions taken on the platforms 16a-16d (e.g., accesses, button actuation, likes, uploading documents, accessing documents, logging in, etc.).

Therefore, the platform selector 44 may identify a specific platform of the platforms 16a-16d to receive the current content based on the analysis of the feature recognizer 42, relevance identifier 32, type identifier 34, historical analyzer 36 and social connector 38, while the timer 40 may identify a timing at which the current content should be provided to and activated on the specific platform of the platforms 16a-16d. The feature recognizer 42, platform selector 44, relevance identifier 32, type identifier 34, historical analyzer 36, social connector 38 and the timer 40 include logic instructions, computer readable program instructions, configurable logic, fixed-functionality hardware logic, etc., or any combination thereof.

In some embodiments, the cognitive analyzer 24 generates cognitive insights. The cognitive insights indicate which platforms 16a-16d are the best fit for the current content based on the outputs of the relevance identifier 32, the type identifier 34, the historical analyzer 36, and the social connector 38. Therefore, the cognitive analyzer 24 identifies a level of interest an audience of the platforms 16a-16d will have to the current content. Furthermore, in some embodiments the cognitive analyzer 24 identifies when to post the current content to increase a probability that the current content will be viewed. The cognitive analyzer 24 automatically provides the current content to the selected platforms 16a-16d, and to be posted at the selected timing.

While four platforms 16a-16d are illustrated, embodiments described herein include any number of platforms. Moreover, while the cognitive analyzer 24 is illustrated as being separate from the user device 26, in some embodiments the cognitive analyzer 24 is be part of the user device 26. In some embodiments, the cognitive analyzer 24 is stored on a device remote from the user device 26, such as a server or in a cloud.

Figure 2:
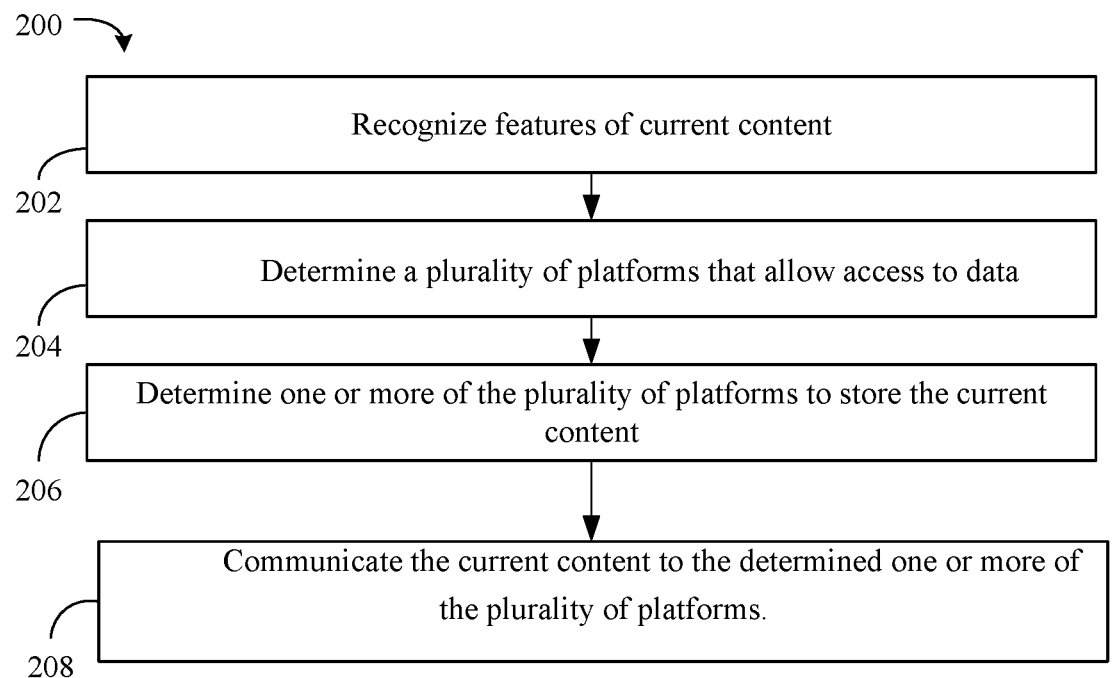
FIG. 2 is a flowchart of an example of a method of cognitive processing according to an embodiment.

FIG. 2 shows a method 200 of identifying platforms for content storage. The method 200 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). The method 200 may be implemented by the cognitive analyzer 24 of FIG. 1.

Illustrated processing block 202 provides for recognizing features of current content associated with a current user. As described, the recognized features may include a type of the content (e.g., computer code, social posts, pictures, enterprise documentation, etc.), names referenced in the content, images in the content, and so forth.

Illustrated processing block 204 provides for determining a plurality of platforms that allow access to data stored on the platforms by other users. Such platforms may be social media sites, enterprise sites and so forth. Access may include users viewing the data, downloading the data, performing a process with an executable file of the data, and so forth.

Illustrated processing block 206 provides for determining one or more of the plurality of platforms to store the current content. The determination at block 206 may be based on cognitive matching as described above. Illustrated processing block 208 includes communicating the current content to the determined one or more of the plurality of platforms, and may further include communicating the current content at a specific timing.

Thus, method 200 may provide current content to a most relevant platform. The method 200 may therefore reduce the latency of the upload of the current content and reduce computing resources required for uploading the current content by avoiding uploading the current content to less relevant platforms. Further, the method 200 may enhance the exposure of the current content by increasing the probability that the current content will be viewed by an appropriate audience at an appropriate timing.

Figure 3:
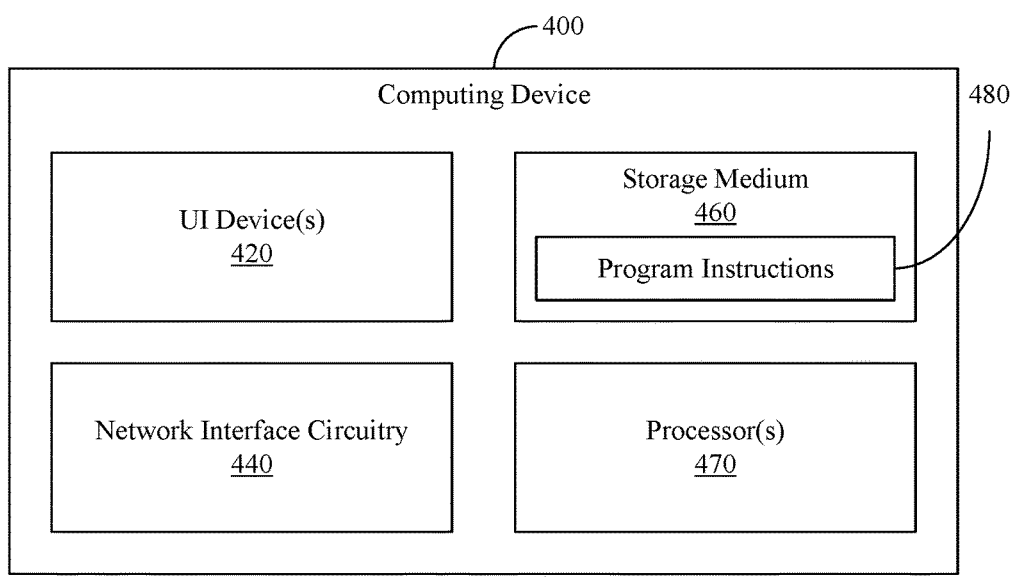
FIG. 3 is a block diagram of an example of a efficiency-enhanced computing device according to an embodiment.

FIG. 3 shows a computing device 400 that in some embodiments is used to identify platforms for content storage. The illustrated computing device 400, which may be centralized (e.g., client device, server) or distributed (e.g., data center, cloud computing infrastructure), includes one or more user interface (UI) devices 420 (e.g., keyboard, mouse, touch pad, touch screen, monitor, microphone, speaker) to output the results of cognitive matching. The computing device 400 may be deployed in the cognitive analyzer 24 of FIG. 1. The computing device 400, may receive requests and transmit requests via network interface circuitry 440 (e.g., wired, wireless) and might communicate with a microservice (e.g., GO, HASKELL), web application (e.g., JAVA, KITURA), and so forth. The computing device 400 may be connected to a plurality of platforms and a user device through the network interface circuitry 440. The computing device 400 may receive a request to upload content from the user device. The computing device 400 may use cognitive matching to identify which platforms to upload the content onto, and transmit the content to the identified platforms.

One or more processors 470 may be coupled to the UI device(s) 420 and a storage medium 460 (e.g., non-volatile memory, volatile memory, etc., or any combination thereof). The processor(s) 470 may generally execute the cognitive matching. In the illustrated example, the storage medium 460 includes program instructions 480 embodied therewith. The program instructions 480 may be executable by the processors 470 to cause the computing device 400 to perform one or more aspects of the method 200 (FIG. 2), already discussed. Accordingly, execution of the program instructions 480 by the processor(s) 470 causes the computing device to 400 to recognize features of current content to be shared by a current user, determine a plurality of platforms that allow access to data by other users, and select one or more of the plurality of platforms to store the current content based on the recognized features. As noted, the cognitive matching may reduce power usage, enhance security and/or enhance efficiency from a performance standpoint. While embodiments may include the above features, it is not necessarily required.

Figure 4:
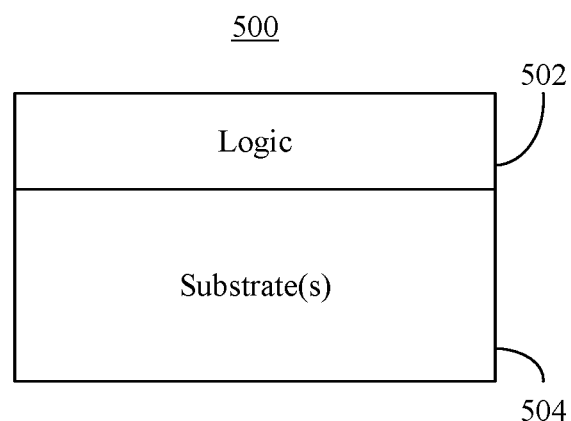
FIG. 4 is an illustration of an example of a semiconductor apparatus according to an embodiment.

Turning now to FIG. 4, a semiconductor package 500 (e.g, chip, die) is provided that includes one or more substrates 504 (e.g., silicon, sapphire, gallium arsenide) and logic 502 (e.g., transistor array and other integrated circuit/IC components) coupled to the substrate(s) 504. The logic 502, which may be implemented at least partly in configurable logic and/or fixed-functionality hardware logic, may generally implement one or more aspects of the method 200 (FIG. 2) already discussed.

Thus, the logic 502 in some embodiments automatically executes cognitive matching to identify suitable platforms for content. Therefore, uploading of the content may be less costly to manage, and the performance of the semiconductor package 500 may be enhanced. The logic 502 may perform one or more aspects of the method 200 (FIG. 2) and be readily substituted for the cognitive analyzer 24 (FIG. 1) to perform the cognitive matching described above.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   recognizing features of current content to be shared by a current user;
   comparing the features of the current content to previous features of previous content shared by the user on plurality of platforms that allow access to data by other users; and
   selecting a platform from the plurality of platforms to store the current content based upon a determination that similar content was previously uploaded to the platform by the user, wherein a content analyzer performs first platform user engagement evaluating of a first platform of the plurality of platforms to analyze actions by first platform users of the first platform with respect to first platform stored content that is related to the current content, and wherein the selected platform from the plurality of platforms that is selected by the selecting to store the current content is dependent on the first platform user engagement evaluating.

2. The method of claim 1, wherein the current content includes a picture, and wherein the content analyzer subjects the picture to object recognition processing to extract a recognized object from the object recognition processing, and wherein the selected platform from the plurality of platforms that is selected by the selecting to store the current content is dependent on the object that is recognized.

3. The method of claim 1, wherein the current content includes unstructured text based content, and wherein the content analyzer subjects the text based content to language analysis processing to extract a recognized meaning from the unstructured text based content, and wherein the selected platform from the plurality of platforms that is selected by the selecting to store the current content is dependent on the meaning that is recognized.

4. The method of claim 1, wherein the content analyzer performs first platform user engagement evaluating of a first platform of the plurality of platforms to analyze sharing actions by first platform users of the first platform with respect to sharable first platform stored content that is related to the current content.

5. The method of claim 1, wherein the selecting the one or more of the plurality of platforms includes:
   determining, based on the recognized features, previously shared content of the current user that is similar to the current content; and
   detecting that the previously shared content was provided to the selected one or more of the plurality of platforms.

6. The method of claim 1, further comprising determining one or more other users that are connected with the current user through the plurality of platforms; and
   wherein the selecting the one or more of the plurality of platforms includes:
   determining, based on the recognized features, of other user content that is similar to the current content, wherein the other user content was previously shared by the one or more other users; and
   determining that the other user content was provided to the selected one or more of the plurality of platforms.

7. The method of claim 1, further comprising determining for each respective platform of the plurality of platforms, types of content that are published by the respective platform; and
   wherein the selecting the one or more of the plurality of platforms includes:
   determining a current type of the current content based on the recognized features; and
   determining for each respective platform of the selected one or more of the plurality of platforms, that the current type is substantially similar to one or more of the types of content published by the respective platform.

8. The method of claim 1, wherein the selecting the one or more of the plurality of platforms includes determining that the recognized features are relevant to one or more other users that are connected with the current user through the selected one or more of the plurality of platforms.

9. The method of claim 1, further comprising determining a timing to communicate the current content to the selected one or more of the plurality of platforms based on a timing of usage of the selected one or more of the plurality of platforms by the other users.

10. A computing device comprising:
one or more processors; and
a computer readable storage medium having program instructions embodied therewith, the program instructions executable by the one or more processors to cause the computing device to perform the method of:
recognizing features of current content to be shared by a current user;
comparing the features of the current content to previous features of previous content shared by the user on plurality of platforms that allow access to data by other users; and
selecting a platform from the plurality of platforms to store the current content based upon a determination that similar content was previously uploaded to the platform by the user, wherein a content analyzer performs first platform user engagement evaluating of a first platform of the plurality of platforms to analyze actions by first platform users of the first platform with respect to first platform stored content that is related to the current content, and wherein the selected platform from the plurality of platforms that is selected by the selecting to store the current content is dependent on the first platform user engagement evaluating.

11. The computing device of claim 10, wherein the current content includes a picture, and wherein the content analyzer subjects the picture to object recognition processing to extract a recognized object from the object recognition processing, and wherein the content analyzer performs evaluating of a first platform of the plurality of platforms to determine in dependence the recognized object whether the first platform is appropriate for receipt of the current content, and wherein the content analyzer performs evaluating of a second first platform of the plurality of platforms to determine in dependence the recognized object whether the second platform is appropriate for receipt of the current content, and wherein the selected platform from the plurality of platforms that is selected to store the current content is dependent on the object that is recognized.

12. The computing device of claim 10, wherein the current content includes unstructured text based content, and wherein the content analyzer subjects the text based content to language analysis processing to extract a recognized meaning from the unstructured text based content, and wherein the content analyzer performs evaluating of a first platform of the plurality of platforms to determine in dependence the recognized meaning whether the first platform is appropriate for receipt of the current content, and wherein the content analyzer performs evaluating of a second first platform of the plurality of platforms to determine in dependence the recognized meaning whether the second platform is appropriate for receipt of the current content, and wherein the selected platform from the plurality of platforms that is selected by to store the current content is dependent on the meaning that is recognized.

13. The computing device of claim 10, wherein the content analyzer performs first platform user engagement evaluating of a first platform of the plurality of platforms to analyze actions by first platform users of the first platform with respect to first platform stored content that is related to the current content, wherein the content analyzer performs second platform user engagement evaluating of a second platform of the plurality of platforms to analyze actions by second platform users of the second platform with respect to second platform stored content that is related to the current content, and wherein the selected platform from the plurality of platforms that is selected to store the current content is dependent on the second platform user engagement evaluating.

14. The computing device of claim 10, wherein the content analyzer performs first platform user engagement evaluating of a first platform of the plurality of platforms to analyze sharing actions by first platform users of the first platform with respect to sharable first platform stored content that is related to the current content, wherein the content analyzer performs second platform user engagement evaluating of a second platform of the plurality of platforms to analyze sharing actions by second platform users of the second platform with respect to sharable second platform stored content that is related to the current content, and wherein the selected platform from the plurality of platforms that is selected to store the current content is dependent on the second platform user engagement evaluating.

15. The computing device of claim 10, wherein the current content includes a picture, and wherein the content analyzer subjects the picture to object recognition processing to extract a recognized object from the object recognition processing, and wherein the selected platform from the plurality of platforms that is selected to store the current content is dependent on the object that is recognized.

16. The computing device of claim 10, wherein the current content includes unstructured text based content, and wherein the content analyzer subjects the text based content to language analysis processing to extract a recognized meaning from the unstructured text based content, and wherein the selected platform from the plurality of platforms that is selected to store the current content is dependent on the meaning that is recognized.

17. The computing device of claim 10, wherein the content analyzer performs first platform user engagement evaluating of a first platform of the plurality of platforms to analyze actions by first platform users of the first platform with respect to first platform stored content that is related to the current content.

18. The computing device of claim 10, wherein the content analyzer performs first platform user engagement evaluating of a first platform of the plurality of platforms to analyze sharing actions by first platform users of the first platform with respect to sharable first platform stored content that is related to the current content.

19. A computer program product to distribute current content, the computer program product comprising a computer readable storage medium having program instructions embodied therewith, the program instructions executable by a computing device to cause the computing device to perform the method of:
recognizing features of current content to be shared by a current user;
comparing the features of the current content to previous features of previous content shared by the user on plurality of platforms that allow access to data by other users; and
selecting a platform from the plurality of platforms to store the current content based upon a determination that similar content was previously uploaded to the platform by the user, wherein a content analyzer performs first platform user engagement evaluating of a first platform of the plurality of platforms to analyze actions by first platform users of the first platform with respect to first platform stored content that is related to the current content, and wherein the selected platform from the plurality of platforms that is selected by the selecting to store the current content is dependent on the first platform user engagement evaluating.

\* \* \* \* \*